United States Patent Office 2,967,449
Patented Jan. 10, 1961

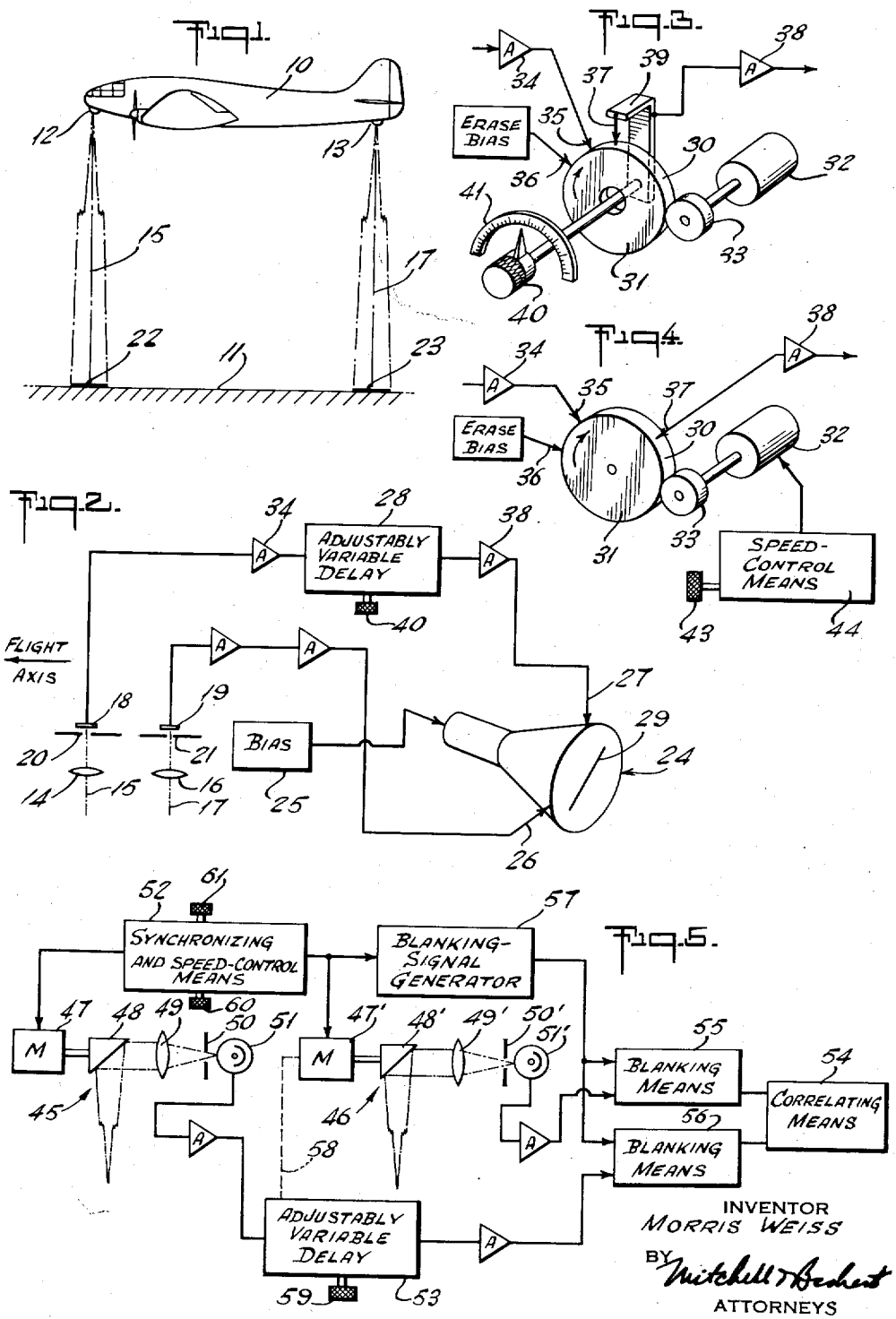

2,967,449

OPTICAL GROUND-SPEED METER

Morris Weiss, Wantagh, N.Y., assignor to Servo Corporation of America, New Hyde Park, N.Y., a corporation of New York Filed Jan. 6, 1955, Ser. No. 480,255

11 Claims. (Cl. 88—1)

My invention relates to a speed-indicating device for determining the relative speed of two relatively moving bodies and is of particular application to the determination (aloft) of ground speed of an aircraft equipped with my device.

It is an object of the invention to provide improved means of the character indicated.

It is another object to provide an improved airborne ground-speed indicator capable of operation independently of head- and tail-wind conditions in flight.

It is a further object to provide an airborne ground-speed indicator operating entirely passively, that is, without emission of energy.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified side view, in elevation, of an aircraft equipped with my device and flying over a section of terrain;

Fig. 2 is a simplified electrical block diagram schematically indicating component parts of my device;

Figs. 3 and 4 are fragmentary diagrams schematically illustrating alternatives for one of the components of Fig. 2; and Fig. 5 is another block diagram schematically showing mechanical, optical, and electrical components of an alternative ground-speed meter.

Briefly stated, my invention contemplates derivation of velocity data from two energy-responsive elements, associated respectively with optical systems in fixedly spaced relation, in the sense of movement to be observed for speed. The optical axes are arranged parallel to each other so as to assure derivation of speed, independent of distance between the relatively moving bodies. In specific application to aircraft, the optical systems are preferably mounted as far longitudinally apart as possible, and their axes are directed vertically. The inherent nature of the cooperation between the energy-responsive elements and their associated optical system is that, in flight, each element develops a continuously and randomly varying electrical output or video signal. Correlating means are connected to respond to the separate video outputs of two sensitive elements, and one of the connections includes delay means whereby, upon achieving correlation for a given delay, and of course knowing the fixed spacing between optical axes, ground speed is inherently derived.

Referring to Figs. 1 and 2 of the drawings, my invention is shown in application to an aircraft 10 proceeding in flight above a portion of terrain 11. Separate optical systems of the invention may be fixedly mounted at fore and aft stations 12—13 on the aircraft, as in the blisters suggested in the drawing. For the form depicted in Fig. 2, the optical systems are fixed, or at least held relatively stable, with vertical orientation; the fore optical system 14 is thus characterized by the vertical axis 15, and the aft optical system 16 is characterized by the vertical axis 17. Associated with the respective optical systems are energy-responsive elements 18—19 and, if desired, slit or aperture means 20—21 may be associated with each optical system to assure response of the elements 18—19 to relatively small spaced areas, as at 22—23, on the ground.

Since the longitudinal distance between the optical axes 15—17 is fixed and ascertained, it is merely necessary to know the delay between video signals developed at 18—19 in order to ascertain ground speed. In the form of Fig. 2, this is achieved by means of a simple correlating device employing the cathode-ray tube 24, with a method of presentation described in greater detail in copending patent application Serial No. 480,436, filed January 7, 1955, and now Patent Number 2,878,713, in the name of Henry Blackstone. Suffice to say that a steady bias available at 25 is caused to produce an unmodulated spot on the display 24, and the separate video outputs from cells 18—19 are suitably amplified and fed to mutually perpendicular deflection systems 26—27 of the display means 24. Included in one of these connections, that is, in the connection to the lead element 18, is adjustably variable delay means 28. In the absence of correlation, there will be no particular definition to the display at 24, but, upon achieving or approaching correlation, the two video signals will match and a line 29 will tend to form. This line will be inclined approximately half way between the two deflection axes.

In Fig. 3, I schematically indicate a suitable delay mechanism for use at 28 in Fig. 2. This delay mechanism utilizes an endless loop of storage material, such as a strip of magnetic-recording tape 30 applied to the periphery of a continuously driven disc or drum 31. Motor means 32 is shown driving disc 31 by way of a rim wheel or tire 33. The video signal from element 18 is pre-amplified at 34 before application to a recording head 35. An erasing bias is continuously applied at an erasing head 36 so that current video may always be cleanly recorded. A pick-up head 37 transcribes the delayed video for amplification at 38 and for application to the deflection system 27. Variable delay is achieved by relatively displacing the heads 35—37 with respect to the length of the tape 30; in the form shown, head 35 is fixed while head 37 is movably carried on an arm 39, whose position about the axis of disc 31 is manually determined by knob 40. An indicator on knob 40 may be read directly against a fixed scale 41, in a determination of ground speed once correlation has been observed at 24.

In the alternate delay means of Fig. 4, many components may resemble those of Fig. 3, so that corresponding parts are given the same reference numerals. The difference in the case of Fig. 4 is that motor 32 is of the variable speed variety, and I show a manual knob 43 for adjusting-speed control means 44 for motor 32. It will be clear that, upon noting the setting of knob 43 for which correlation at 24 is achieved, ground speed may be a direct function of such setting.

In Fig. 5, I show another version of my ground speed meter, employing scanning optical systems 45—46 rather than fixed optical systems. Each of the optical systems is caused to image an energy-responsive cell on the ground 11, and the arrangement is such that the scanning planes of the respective scanners 45—46 are parallel and preferably vertically oriented. The scanner 45 is shown to comprise a motor 47 continuously driving a 45°-inclined mirror 48, about an axis aligned with the flight axis. A fixed lens 49 on the rotation axis of mirrow 48 focuses the scanned intelligence through a slit 50 and onto photocell or other energy-responsive means 51. The same arrangement of parts is preferably employed for the scanner 46, and therefore the same reference numerals are used, but with primed notations.

Synchronizing and speed-control means for the two scanning motors 47—47' are suggested at 52, and adjustably variable delay 53 is employed to connect the lead scanner 45 to correlating means 54, while the video output from the other scanner is directly connected to the correlating means; the variable delay 53 may be of various forms, such as exemplified by Figs. 3 and 4 or by well-known endless-tape recorders. Because the scanners derive useful information only which facing the terrain, I prefer to blank the supply of video to the correlating means during the non-utilizable intervals. For this purpose, separate blanking means 55—56 are interposed in the respective video input lines to correlating means 54, and a blanking-signal generator 57 controls the devices 55—56 in synchronism with motor speed.

The device of Fig. 5 lends itself to alternative operations, any one of which may produce ground-speed information. In one mode of operation, the setting of delay means 53 is established in accordance with motor speed, as suggested by the synchronizing connection 58. The delay at 53 may thus be held assuredly to the period of scan action or to an integer multiple thereof and, if desired, a knob 59 on delay means 53 may select which integer multiple of the scan period is to be employed. Under such circumstances, ground speed is ascertained by manipulating the speed-control knob 60 until correlation is observed at 54, at which time the setting of knob 60 (multiplied or divided, as the case may be, by the setting of knob 59) may directly yield ground speed information.

In an alternative mode of operation, the delay at 53 may be relatively fixed. Under such circumstances, the motor-control means 52 may incorporate a differential mechanism, as under control of a knob 61, for assuring synchronized operation of motors 47—47', but determining controlled phase displacement therebetween. Under such circumstances, ground speed is ascertained when, upon adjustment of knob 61, correlation is observed at 54. The setting at 61 will then, for a given speed of motors 47—47', and for a given delay selected at 59, be a direct indication of ground speed.

It will be seen that I have described a relatively simple means for deriving absolute ground speed or, more broadly, absolute speed of any vehicle or body with respect to another body. In particular application to aircraft, the device is inherently characterized by passive operation and by relatively little complexity.

While I have described my invention in detail for the preferred forms shown, it will be understood that modifications may be made without departing from the scope of the invention as defined in the claims which follow.

I claim:

1. A speed-indicating device of the character indicated for determining the relative speed of two relatively moving bodies, two energy-responsive elements and means developing separate continuously and randomly varying electrical output signals for the responses of said elements, separate optical systems respectively focused on said elements and mounted on one of said bodies, said elements being mounted in spaced relation from each other in the sense of said relative movement and having axes directed toward the other of said bodies and in strictly parallel planes, said planes being spaced from each other by substantially the distance between said elements, and correlator means connected to both energy-responsive elements and responsive to both electrical output signals and including means variably delaying the output of one of said elements with respect to that of the other until correlation is achieved, whereby the amount of delay necessary to achieve maximum correlation is a direct measure of said relative speed, and further whereby said measurement of speed is independent of the spacing between the two relatively moving bodies.

2. An airborne ground-speed indicating device, comprising two energy-responsive elements, means developing separate continuously and randomly varying electrical output signals for the responses of said elements, separate optical systems respectively focused on said elements and mounted at fore and aft locations on an aircraft, said axes being directed beneath the aircraft and in strictly parallel planes, said planes being spaced from each other by substantially the distance between said optical systems, and correlator means connected to both energy-responsive elements and responsive to both electrical output signals and including means variably delaying the output of the leading one of said elements with respect to that of the other until correlation between the two output signals is achieved, whereby the amount of delay necessary to achieve correlation is a direct measure of ground speed, and further whereby the ground speed measurement is independent of altitude.

3. A device according to claim 2, in which said parallel planes are perpendicular to the flight axis of the aircraft.

4. In an aircraft ground-speed indicating device of the character indicated, two separate optical systems located at fore and aft stations on the aircraft, means orienting the axes of said optical systems in strictly parallel relation and vertically, two energy-responsive elements, each said element being located at the focus of a different one of said optical systems and including means developing a continuously and randomly varying electrical output signal, and correlator means connected to both energy-responsive elements and responsive to both said output signals and including means variably delaying the output of the leading one of said elements with respect to the other until correlation of both output signals is achieved, whereby the amount of delay necessary to achieve maximum correlation is a direct measure of ground speed, and further whereby the ground speed measurement is independent of altitude.

5. A device according to claim 4, in which said delaying means includes a continuous loop of storage material, a recording head, a pick-up head, erasing means, and means continuously driving said loop.

6. A device according to claim 5, in which said drive means includes selectively variable speed-control means, whereby the effective delay between recording and pick-off may be selectively varied.

7. The device according to claim 5, and including means for variably spacing said recording and pick-up heads along the length of said storage material, whereby effective delay in said storage material may be selectively varied.

8. A device according to claim 4, in which said optical systems are oriented to image said elements in longitudinally spaced parallel planes beneath the aircraft and extending generally transversely of the flight axis, each of said optical systems including drive means for causing the respective images of said elements to scan by traversing the terrain beneath the aircraft in said planes, and means continuously synchronizing the scans of said optical systems.

9. A device according to claim 8, in which said delay means incorporates provision for variable delay, and a delay-controlling connection between said delay means and the drive means for the scanning optical elements.

10. A device according to claim 8, in which the delay in said delay means is fixed, and in which said synchronizing means includes means for phase-displacing the drive to one of said optical systems with respect to the drive to the other of said optical systems.

11. A device according to claim 8, in which the delay in said delay means is fixed, and in which said synchronizing means includes means for selectively controlling the speed of scan while maintaining synchronism of motion of both said optical systems.

References Cited in the file of this patent

UNITED STATES PATENTS

| | | |
|---|---|---|
| 1,946,290 | Lord | Feb. 6, 1934 |
| 2,166,991 | Guanella | July 25, 1939 |
| 2,292,641 | Jones | Aug. 11, 1942 |
| 2,409,672 | Fischer et al. | Oct. 22, 1946 |
| 2,422,135 | Sanders | June 10, 1947 |
| 2,439,295 | Hammond et al. | Apr. 6, 1948 |
| 2,626,986 | MacNichol et al. | Jan. 27, 1953 |
| 2,769,492 | Ostergren et al. | Nov. 6, 1956 |
| 2,866,373 | Doyle et al. | Dec. 30, 1958 |